(12) United States Patent
Hunze

(10) Patent No.: US 9,074,875 B2
(45) Date of Patent: Jul. 7, 2015

(54) DEVICE AND METHOD FOR ALIGNMENT OF AN APPLIANCE

(71) Applicant: Sven Hunze, Sehnde (DE)

(72) Inventor: Sven Hunze, Sehnde (DE)

(73) Assignee: Aliba Maschinenbau GmbH, Giesen (DE)

( * ) Notice: Subject to any disclaimer, the term of this patent is extended or adjusted under 35 U.S.C. 154(b) by 274 days.

(21) Appl. No.: 13/623,572

(22) Filed: Sep. 20, 2012

(65) Prior Publication Data

US 2013/0074348 A1 Mar. 28, 2013

(30) Foreign Application Priority Data

Sep. 23, 2011 (DE) .......................... 10 2011 083 359

(51) Int. Cl.
*G01B 11/14* (2006.01)
*G01C 15/00* (2006.01)
*G01B 11/27* (2006.01)

(52) U.S. Cl.
CPC ................ *G01B 11/14* (2013.01); *G01C 15/00* (2013.01); *G01B 11/272* (2013.01)

(58) Field of Classification Search
CPC ........... G01C 15/00; G01C 3/00; G01C 1/00; G01C 9/12; G01C 15/10; G01B 11/27
USPC ............................................ 33/286, DIG. 21
See application file for complete search history.

(56) References Cited

U.S. PATENT DOCUMENTS

| | | | | |
|---|---|---|---|---|
| 5,864,956 A * | 2/1999 | Dong | ............................... | 33/227 |
| 6,301,997 B1 * | 10/2001 | Welte | ............................. | 33/286 |
| 6,796,040 B2 * | 9/2004 | Ohtomo et al. | ................ | 33/286 |
| 6,877,236 B1 * | 4/2005 | Williams | ........................ | 33/286 |
| 6,891,148 B1 * | 5/2005 | Rivera et al. | .................... | 33/276 |
| 6,898,860 B2 * | 5/2005 | Wu | ................. | 33/286 |
| 6,931,739 B2 * | 8/2005 | Chang et al. | .................... | 33/286 |
| 6,937,336 B2 * | 8/2005 | Garcia et al. | .................. | 356/399 |
| 6,964,106 B2 * | 11/2005 | Sergyeyenko et al. | .......... | 33/286 |
| 7,146,739 B2 * | 12/2006 | Ku et al. | ......................... | 33/286 |
| 7,328,516 B2 * | 2/2008 | Nash et al. | ...................... | 33/286 |
| 7,454,839 B2 * | 11/2008 | Della Bona et al. | ............. | 33/283 |
| 7,672,001 B2 | 3/2010 | Hermann | | |
| 7,748,127 B1 * | 7/2010 | Cosimano | ....................... | 33/286 |
| 7,984,557 B1 * | 7/2011 | Carl | ............................... | 33/263 |
| 8,307,562 B2 * | 11/2012 | Bascom et al. | ................. | 33/286 |
| 8,640,350 B2 * | 2/2014 | Bascom et al. | ................. | 33/286 |
| 2005/0198845 A1 * | 9/2005 | Robinson | ....................... | 33/227 |
| 2006/0112581 A1 * | 6/2006 | Nortmann et al. | .............. | 33/638 |
| 2007/0028469 A1 * | 2/2007 | Nash et al. | ...................... | 33/286 |
| 2008/0276473 A1 * | 11/2008 | Raschella et al. | ............... | 33/286 |

(Continued)

FOREIGN PATENT DOCUMENTS

| | | |
|---|---|---|
| DE | 42 27 525 | 4/1993 |
| DE | 100 37 532 | 2/2001 |
| DE | 10 2005 043 000 | 6/2006 |
| DE | 10 2006 023 926 | 11/2007 |

(Continued)

*Primary Examiner* — Yaritza Guadalupe-McCall
(74) *Attorney, Agent, or Firm* — Greer, Burns & Crain, Ltd.

(57) ABSTRACT

The invention provides a device and a method for relative positioning of an appliance having a shaft end in relation to fastening elements which are arranged at a distance to the longitudinal axis of the shaft end and at a distance in front of the end of the shaft end and is disposed for generation of a first and a second light fan which extend symmetrically along the longitudinal axis of the shaft end and form light lines extending over the end of the shaft end.

16 Claims, 2 Drawing Sheets

(56) References Cited

U.S. PATENT DOCUMENTS

Figure 1:
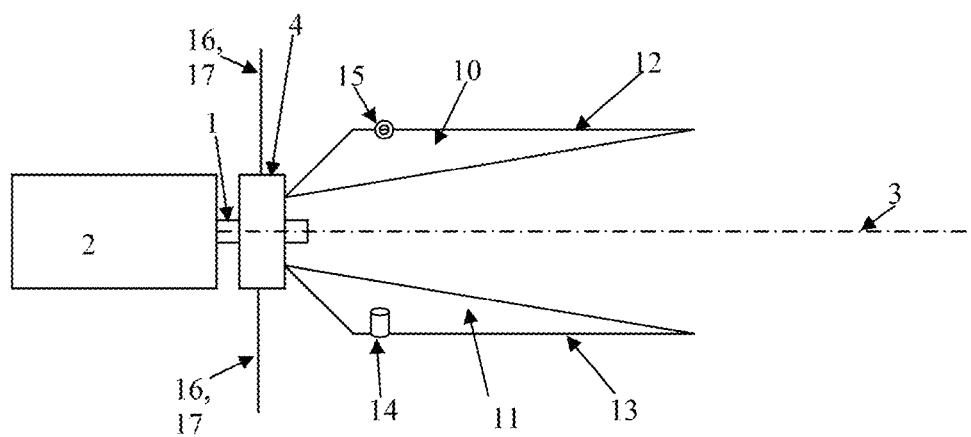

2011/0161034 A1  6/2011  Barth
2013/0074348 A1* 3/2013  Hunze .............................. 33/228
2013/0263459 A1* 10/2013 Rabiner et al. .................. 33/228

FOREIGN PATENT DOCUMENTS

| | | |
|---|---|---|
| DE | 10 2008 010 916 | 8/2009 |
| DE | 10 2010 053 750 | 7/2011 |
| WO | WO 2009-024381 | 2/2009 |

* cited by examiner

DEVICE AND METHOD FOR ALIGNMENT OF AN APPLIANCE

The present invention claims the priority of the German patent application 10 2011 083 359.5 having a filing date of 23. Sep. 2011.

The present invention relates to a device and to a method for alignment of an appliance having a shaft end, especially for alignment of an appliance in relation to fastening elements, e.g. a pair of bore holes or screws which are arranged at a distance in front of the shaft end of the appliance, and for alignment of fastening elements at a distance to the end of the shaft end of an appliance, respectively, especially for a relative alignment in which the longitudinal axis of the shaft end is arranged symmetrically and centrically between the fastening elements, respectively. The appliance is a machine, either a drive motor or a driven machine.

The method for alignment serves for positioning of the appliance in relation to fastening elements of a second appliance which has a second shaft end and is fixed at the fastening elements which are arranged at a distance in front of the shaft end of the appliance.

After the alignment the method especially comprises the subsequent step of connecting the shaft end of the appliance to the second shaft end of the second appliance along a common rotational axis.

The device and the method are suitable for arrangement of the appliance with a shaft end in relation to fastening elements, which e.g. are bores, serving as base holes for fastening of a second appliance having a second shaft end, wherein both shaft ends are to be arranged on a common longitudinal axis. By means of the device according to the invention the appliance can be arranged and aligned at a distance to the fastening elements such that the shaft end is arranged in a predetermined relation to the spaced fastening elements, especially such that the bores are arranged symmetrically to the longitudinal axis of the shaft end.

STATE OF THE ART

DE 10 2008 010 916 A1 describes a device for measurement of the alignment of two shaft ends arranged against one another having a first measurement unit generating a light beam spread in a plane and having a measurement unit which is to be fastened on the opposite shaft end having two spaced CCD line arrays which are swept by the spread light beam.

DE 42 27 525 A1 describes the alignment of a machine on a floor space by installing alignment marks of machine components movable against one another and moving of one machine component to the precise alignment of the alignment marks to one another in order to position function openings in the machine components to one another.

U.S. Pat. No. 7,672,001 B1 shows a device for alignment of two appliances having opposite shaft ends, one part of which device is arranged on the shaft end of the one appliance and emits at least two light fans and the other part is arranged on the shaft end of the further appliance and has annularly arranged light sensors.

OBJECT OF THE INVENTION

The object of the invention is the provision of a device and a method for alignment of an appliance in relation to bores which lie in a plane that is spaced from the longitudinal axis of the shaft end of the appliance and are spaced in an axial distance along the shaft end, and for arrangement of such bores at a distance to the appliance, respectively.

GENERAL DESCRIPTION OF THE INVENTION

The invention achieves the object with the features of the claims and especially provides a device and a method for relative positioning of an appliance having a shaft end in relation to fastening elements which are arranged at a distance to the longitudinal axis of the shaft end and at a distance in front of the end of the shaft end. Such fastening elements e.g. are bores and can have a thread and especially serve for receiving fastening screws which are guided through base holes of a second appliance. Alternatively, the fastening elements can be fastening elements protruding over a surface, e.g. protruding pins or screws. For the purposes of the invention, positions of fastening elements to be marked are also denoted as fastening elements, as the positions for fastening elements for a second appliance which are placed at a distance in front of the shaft end of an appliance can be determined using the device and the method, starting from the shaft end of the one appliance.

Due to the alignment of the device according to the invention which is arranged on the shaft end of an appliance to the fastening elements which lie at a distance in front of the appliance and e.g. serve for fixation of a second appliance, the method according to the invention can proceed in the absence of the second appliance and therefore has no element which is to be connected to the shaft end of the second appliance.

The device according to the invention has a contact piece which is to be arranged at the shaft end of the appliance and preferably is positioned against a wedge or against the abutting surface of the shaft end of the appliance. Preferably, the contact piece has a recess symmetrical to the longitudinal axis of the shaft end, the recess having a longitudinal axis such that upon arrangement of the contact piece against the shaft end the device according to the invention is arranged in a predetermined relation to the longitudinal axis of the shaft end, wherein especially the longitudinal axis of the recess is arranged in parallel to the longitudinal axis of the shaft end. The device, in particular the contact piece, can have a clamping means by which the contact piece can be loaded against the shaft end, for example a clamping means encircling the shaft end which is fixed at the contact piece. A clamping means can be a chain tensible around the shaft end, a clamp and/or a magnet.

The device is characterized in that it is disposed for generation of a first and a second light fan, especially extending in parallel, particularly preferred additionally symmetrically along the longitudinal axis of the shaft end, in particular symmetrically to a longitudinal median plane which extends between the planes in which the light fans extend. Preferably, the longitudinal median plane to which the planes of the light fans are symmetrical extends along the longitudinal axis of the recess of the contact piece which recess especially lies in parallel to the longitudinal axis of the shaft end when the device is arranged on the shaft end. These light fans, each of which is a light beam spread in a plane, therefore each extend in planes which are arranged in parallel to the longitudinal axis of the shaft end. Upon arrangement of the device on the shaft end of an appliance, the first and second light fans form a first and a spaced parallel second light line both extending over the end of the shaft end in a plane spaced from the plane of the longitudinal axis of the shaft end, for example in the plane of the base plate on which the appliance is arranged.

In a plane which extends at a distance to the longitudinal axis of the shaft end, especially in parallel to the longitudinal axis of the shaft end, and which plane extends at a distance to the abutting surface of the shaft end, the device according to the invention allows the projection of two parallel light lines which are generated by these light fans symmetrically to the longitudinal axis of the shaft end. Since the light lines extend beyond the abutting surface of the shaft end, the device enables the alignment of a shaft end to fastening elements which are located at a distance to the end of the shaft end, solely by arrangement of the device on the shaft end, especially without additional alignment elements being necessary, for example in the region of the fastening elements.

Preferably, the device has a plumbing device and is disposed to generate the light fans symmetrically to the vertical. A plumbing device can be a plummet determining the vertical, especially a vertically aligning plummet or a horizontally aligning device, for example a level.

Preferably, a first optical element is disposed for the generation of the first light fan and a second optical element is disposed for the generation of a second light fan. The first optical element and the second optical element can have a common light source from which light is distributed onto the optical elements, or they can have a light source each. The optical elements of the device which are disposed for the generation of the first and second light fans which are arranged symmetrically to the longitudinal axis of the shaft end, particularly preferred symmetrically to the longitudinal axis of the recess to which the longitudinal axis of the shaft end is in parallel, preferably are movable against one another, e.g. pivoted against one another, especially moveable in a coupled way against one another symmetrically to the longitudinal axis of the shaft end, especially moveable perpendicularly to the longitudinal axis. The optical elements can be pivoted symmetrically against one another in relation to the longitudinal axis of the shaft end and/or can be pivoted and slideable symmetrically against one another in relation to the longitudinal axis of the shaft end, respectively, especially slideable against one another perpendicularly to the longitudinal axis of the shaft end. In embodiments having optical elements which are pivoted symmetrically to one another in relation to the longitudinal axis of the shaft end, the device e.g. is disposed to pivot the first and second light fans each in parallel to the longitudinal axis and/or symmetrically against one another along the longitudinal axis of the shaft end, especially to pivot in a coupled way and symmetrically to the longitudinal axis of the shaft end. The description of the optical elements as pivoted correspondingly also is the description of the light fans as pivoted, such that the features which are mentioned with reference to the pivoted optical elements are substitutionally mentioned also with reference to the pivoted light fans and apply for these.

Generally, the optical elements are disposed to pivot the first and/or second light fan in parallel to the longitudinal axis of the shaft end such that the light lines generated by the light fans on a base plate and across the fasting elements spaced from the appliance, respectively, are pivotable in parallel to the longitudinal axis. Generally, in the invention the longitudinal axis of the recess of the contact piece is also used substitutionally for the longitudinal axis of the shaft end, this especially, as these are arranged in parallel upon arrangement of the recess against the shaft end. In a simple embodiment only the first optical element and only the first light fan, respectively, are pivoted, as the device upon arrangement on a shaft end is rotatable with this shaft end. Preferably, the first and the second optical elements and the first and the second light fans, respectively, are pivoted.

In embodiments in which the optical elements are disposed to be moved along a guiding perpendicularly to the longitudinal axis of the shaft end, and especially are guided in a coupled way symmetrically against the longitudinal axis of the shaft end, the device is disposed to move the first and second light fans in parallel to one another and in parallel to the longitudinal axis of the shaft end, e.g. in that it has a guiding along which the optical elements are guided movably. Generally preferred, the optical elements are pivotably supported at one another and/or are pivotably supported at the contact piece each and at an element firmly connected to the contact piece, respectively.

For a precise and/or controlled pivoting movement in parallel to the longitudinal axis of the recess of the contact piece, preferably at least the first optical element is connected to a pivoting drive, optionally the first and the second optical elements are connected to a pivoting drive, e.g. to a pivoting drive each of which is connected to the contact piece or to an element firmly connected thereto, or to a common pivoting drive which acts onto the first and the second optical elements which drive optionally in addition can be connected to the contact piece or to an element firmly connected thereto. Preferably, the pivoting drive is controlled, especially manually controlled. Optionally, the pivoting drive is motor-driven and controlled, especially is controlled in dependence from a detector for the vertical and is disposed to pivot the first and the second optical elements symmetrically to the vertical. Alternatively or additionally, the pivoting drive can be disposed to pivot the first and second optical elements symmetrically to the longitudinal axis of the contact piece. The pivoting drive can e.g. be a spindle drive, a gearwheel drive or a servomotor drive.

In a first embodiment, the pivoting drive is a spindle drive which e.g. guides at least one optical element, preferably the first and the second optical elements, with a spindle each, which e.g. is arranged in a fixed bearing once and once in a spindle nut, wherein one of the fixed bearing and the spindle nut is arranged at the first optical element and one of these is connected to the contact piece and/or to the second optical element. Preferably, the first and second optical elements are pivoted in a coupled way in that they are guided on a common spindle. Therein, the first and the second optical elements can be guided at sections having a contradirectional thread of the spindle or the spindle is guided at one optical element in a spindle nut and at the other optical element in a fixed bearing. Therein, the spindle nut has a thread matching to the spindle in which the spindle is guided rotatably and longitudinally displaceable and a fixed bearing holds the spindle rotatably and stationarily such that upon turning of the spindle its longitudinal displacement occurs only in the spindle nut.

In a second embodiment, the pivoting drive is a gearwheel drive which e.g. pivotally connects the first or the second optical element to a gearwheel which acts between the first and/or second optical element and the contact piece. Therein, the bearing of the gearwheel can e.g. be firmly connected to the contact piece and the teeth can be in engagement with fitting teeth which are connected to an optical element, or the bearing of the gearwheel can be firmly connected to an optical element and the teeth can be in engagement with fitting teeth which are connected to the contact piece. In this embodiment, too, the optical elements preferably are pivoted in a coupled way, e.g. by the gearwheel acting between the optical elements.

In a third embodiment of the pivoting drive, the first and/or the second optical element can be pivoted by means of at least one electrically driven controlled servomotor. The servomotor can be a controlled stepping motor.

For the purposes of the invention, the fastening elements which are arranged at a distance to the shaft end, especially at a distance to a plane which extends through the end of the shaft end perpendicularly to its longitudinal axis, are fastening elements for a second appliance which has a second shaft end and is to be positioned such that both shaft ends are arranged along a common longitudinal axis. The method, especially by means of the device according to the invention provides for the alignment of the appliance in relation to fastening elements and the arrangement of fastening elements in relation to the appliance, respectively, wherein the bores each are arranged at a distance to the end of the shaft end, by the steps of:

generating a first and a second light fan in planes which are arranged symmetrically to the longitudinal axis of the shaft end of the appliance, especially after arranging the device according to the invention on the shaft end, preferably arranging the first and second light fans symmetrically to the vertical, optionally moving the light fans symmetrically to the longitudinal axis of the shaft end, for example by moving or pivoting the optical elements generating the first and/or the second light fan against one another perpendicularly to a longitudinal median plane which preferably is in parallel to the vertical and which especially in addition runs through the longitudinal axis of the shaft end, wherein preferably the first and the second light fans are moved in a coupled way, especially symmetrically to the longitudinal median plane, carrying out a relative movement between appliance and fastening elements which are arranged at a distance to the end of the shaft end and at a distance to the longitudinal axis of the shaft end, especially by moving the appliance and/or by arranging fastening elements in the plane which is spaced from the longitudinal axis of the shaft end, until at least the first, preferably the first and the second light fans generate light lines in the plane which is spaced from the longitudinal axis of the shaft end which light lines run through the fastening elements spaced from the end of the shaft end, and preferably fixing the appliance or arranging fastening elements, especially bores or pins along the light lines.

In the preferred embodiment, the method comprises the alignment of the device such that the first and the second light fans extend on opposite sides from the vertical, for example by aligning the device by means of a plumbing device. In the method, no element of the device is connected to the further appliance which is fixed and arranged at the fastening elements, respectively, which are arranged at a distance in front of the shaft end of the appliance.

As one of the optical elements, the device preferably has a light source, especially a laser, for example a diode laser, and two spaced mirrors arranged symmetrically against a common longitudinal median plane onto which mirrors the laser beam is spread simultaneously or chronologically staggered, for example by means of a movable mirror and/or by means of a beam splitter. According to the invention, the device can be disposed to generate the light fans chronologically after one another or simultaneously.

Optical elements arranged symmetrically to a common longitudinal median plane, e.g. mirrors onto which a laser light source is directed simultaneously or after one another such that they are illuminated by laser light simultaneously or after one another, can be pivoted symmetrically against the common longitudinal median plane and/or can be movable symmetrically against the common longitudinal median plane. Particularly preferred, the mirrors are pivotably and/or slideably coupled to one another symmetrically to the common longitudinal median plane, wherein particularly preferred the common longitudinal median plane is arranged in parallel to the longitudinal axis of the shaft end, and particularly preferred furthermore is aligned vertically.

Preferably, the device is disposed for generation of a third light fan extending perpendicularly to the longitudinal axis of the shaft end, especially perpendicularly to the longitudinal axis of the recess of the contact piece. Particularly preferred, the device is disposed for generation of a third light fan which is arranged perpendicularly to the planes in which the first and second light fans extend which are movable symmetrically to one another, especially perpendicularly to the planes in which the first and second light fans extend which are arranged in parallel to the longitudinal axis of the shaft end.

The contact piece of the device preferably has a stop which can be arranged against the abutting surface of the shaft end or against a comb or wedge arranged on the shaft end.

DETAILED DESCRIPTION OF THE INVENTION

Figure 2:
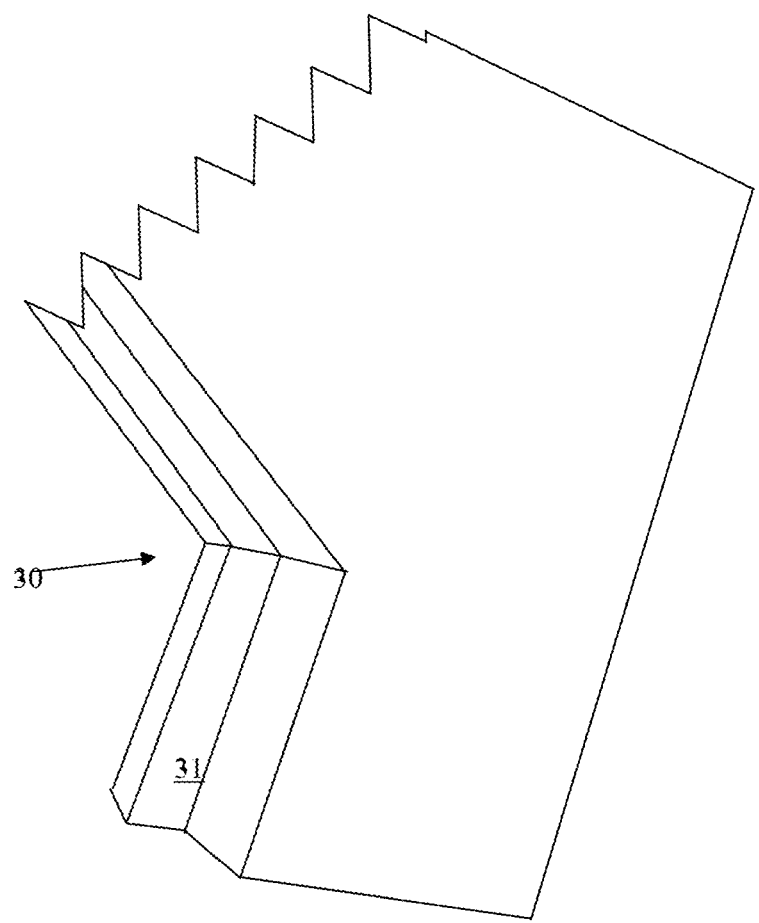
Figure 3:
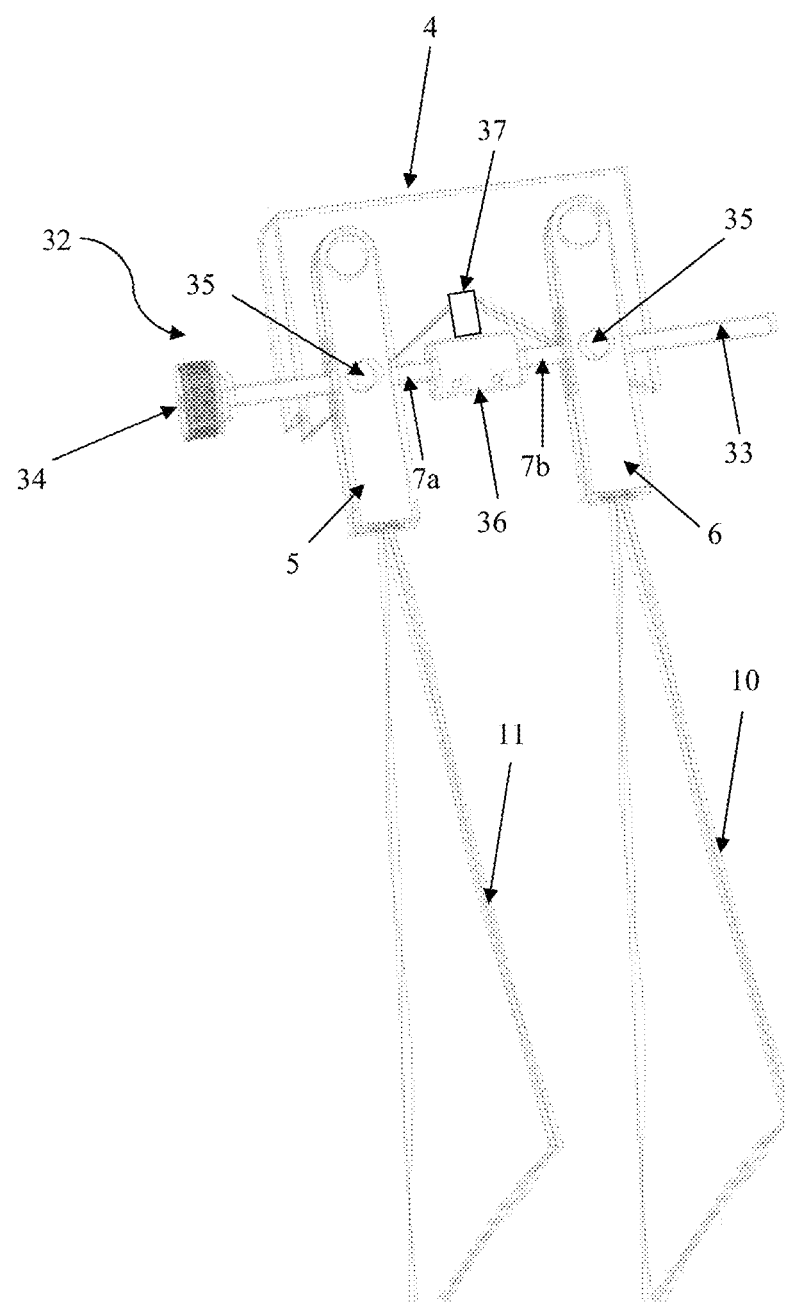

The invention is now described in greater detail by way of examples with reference to the figures which schematically show in FIG. 1 a device according to the invention while carrying out the method, in FIG. 2 a preferred contact piece and in FIG. 3 a coupled pivoting drive for the first and the second optical elements.

As shown in FIG. 1, the device 4 according to the invention when arranged on the shaft end 1 of an appliance 2 by means of optical elements 5, 6 generates a first light fan 10 and a second light fan 11 extending symmetrically to the longitudinal axis 3 of the shaft end 1, preferably symmetrically to a longitudinal median plane running through the longitudinal axis 3 which particularly preferred is vertical. Correspondingly, the device preferably has a plumbing device, for example a mechanical or optical plummet and/or a level, preferably arranged on the device 4 such that the plummet and/or the level is visible from above as the device 4 is arranged on a shaft end.

The first and the second light fans 10, 11 generated by the device 4 generate a first 12 and a second visible light line 13 running in parallel to the longitudinal axis 3 and each at the same distance to the longitudinal axis 3 on a surface which is arranged in a plane spaced from the longitudinal axis 3 of the shaft end 1, e.g. on a support. Upon arrangement of the first light fan 10 and the second light fan 11 at a distance which corresponds to the distance of the fastening elements 14, 15, e.g. a bore 15 or a pin 14, the relative positioning of the appliance 2 and of its shaft end 1, respectively, to the fastening elements 14, 15 can be determined and adjusted. In a first embodiment of the method, the appliance 2 can be moved on its support until the first and second light lines 12, 13 run through the fastening elements 14, 15 in order to align the appliance 2 to existing fastening elements 14, 15 which are arranged at a distance in front of the end of the shaft end 1.

In a second embodiment the first and the second light fans 10, 11 can be adjusted such that they generate the light lines 12, 13 in a predetermined distance on a plane in order to position the fastening elements 14, 15 along the light lines 12, 13, preferably in a predetermined distance to the plane perpendicular to the longitudinal axis 3 of the shaft end 1, which for example runs through the abutting surface of the shaft end 1.

According to the preferred embodiment, the device is disposed for generation of a third light fan 16 which extends perpendicularly to the longitudinal axis 3 of the shaft end 1. Such a third light fan 16 is preferred because it forms a third light line 17 on a plane which is arranged below the shaft end and serves as reference line for the measurement of the distance of the fastening elements 14, 15 to the end of the shaft end 1. The device preferably has a stop at the contact piece which can be arranged against a wedge protruding over the circumference of the shaft and/or against the abutting surface of the shaft end 1. In this embodiment it is preferred to generate the third light fan 16 in a predetermined distance to the stop such that the distance of the third light line 17 to the stop of the contact piece takes a predetermined spacing in order to serve as a reference line for the distance of the fastening elements 14, 15 from the third light line 17.

FIG. 2 shows a contact piece forming a recess 30 in the longitudinal axis of which the longitudinal axis 3 of the shaft end 1 is arranged in parallel upon arrangement of the contact piece at the shaft end 1. According to the preferred embodiment, the contact piece has a stop 31 which lies against a part of the abutting surface of the shaft end 1 for example if a part of the surface of the recess 30 is arranged against the circumferential plane of the shaft end 1.

FIG. 3 shows a device according to the invention having a coupled pivoting drive 32, which is a coupled spindle drive, for the first optical element 5 and the second optical element 6. In the embodiment shown, the spindle drive has a spindle 33 having sections of contradirectional threads 7a, 7b and an adjusting wheel 34 arranged at one end of the spindle 33. The first and the second optical elements 5, 6 each are guided by the spindle 33 which is arranged in spindle nuts 35 one each of which is connected to an optical element 5, 6. In the section 7a in which the spindle 33 is supported in the first spindle nut 35 arranged at the first optical element 5, the spindle 33 has a contradirectional thread to the section 7b in which it is supported in the second spindle nut 35 arranged at the second optical element 6. The spindle nuts 35 arranged at the optical elements 5, 6 each have a thread fitting to the spindle 33.

In the section in which the contradirectional thread sections 7a, 7b of the spindle 33 converge, the spindle optionally has a connection piece 36 which preferably is a fixed bearing, e.g. a thrust bearing connected to the contact piece in a fixed way via a mounting 37. The coupled pivotability of both optical elements 5, 6 is achieved by the spindle drive which has the adjusting wheel 34 at one end of the spindle 33 upon turning of the adjusting wheel 34 results in a movement of the optical elements 5, 6 towards one another, and upon turning in opposite direction away from one another, respectively, due to the sections of contradirectional threads 7a, 7b of the spindle 33.

The invention claimed is:

1. Device for alignment of an appliance in relation to fastening elements or for alignment of fastening elements at a distance to an end of a shaft end of the appliance, the device having a contact piece having a recess having a longitudinal axis for arrangement against a shaft end, and having optical elements having at least one light source, wherein a first one of the optical elements is disposed to generate a first light fan and second one of the optical elements is disposed to generate a second light fan, the first and the second light fans extending in planes which are arranged symmetrically to a common longitudinal median plane arranged along the longitudinal axis, wherein the optical elements are movable in a coupled way symmetrically to the longitudinal axis of the shaft end to pivot the first light fan with respect to the second light fan.

2. Device according to claim 1 which is disposed to generate the first and second light fans symmetrically to the common longitudinal median plane which runs through the longitudinal axis of the shaft end, wherein the first optical element and the second optical element are each connected to a pivoting driver or to one common pivoting drive and are pivoted symmetrically to the longitudinal axis with coupling.

3. Device according to claim 1 having a plumbing device for determination of the vertical.

4. Device according to claim 1 having a plumbing device, wherein the optical elements are disposed to generate the first and second light fans symmetrically to the vertical.

5. Device according to claim 1, in which the contact piece has a recess symmetrical to a longitudinal axis against which the shaft end lies such that its longitudinal axis is in parallel to the longitudinal axis of the recess.

6. Device according to claim 1, which is disposed for generation of a third light fan extending in a plane perpendicular to the plane of the first and/or the second light fan.

7. Device according to claim 6, characterized in that the third light fan is arranged perpendicularly to the longitudinal median plane in relation to which the first and the second light fans extend symmetrically.

8. Device according to claim 1, in which the optical elements are disposed to pivot or slide the first and second light fans symmetrically to the longitudinal median plane with coupling.

9. Device according to claim 1 having a stop of the contact piece which is arrangeable against the abutting surface of the shaft end and/or against a wedge extending over the circumference of the shaft end.

10. Device according to claim 1, wherein the optical elements are movable by being pivotable or slideable symmetrically against one another in relation to the longitudinal axis of the shaft end.

11. Device according to claim 1, wherein the optical elements are coupled via contradirectional threads such that turning of the threads in one direction causes the optical elements to symmetrically move in opposite directions away from each other and in a second direction causes the optical elements to symmetrically move toward each other.

12. A method for alignment of an appliance having of a shaft end in relation to fastening elements or for alignment of fastening elements relatively to an appliance having a shaft end, wherein the fastening elements are arranged at a distance to the plane which is arranged in perpendicular to the longitudinal axis of a shaft end of the appliance and at a distance to the longitudinal axis of the shaft end of the appliance, with the steps of generating a first light fan and a second light fan symmetrically to a longitudinal median plane which runs through the longitudinal axis of the shaft end, and generating a first light line and a second light line across the fastening elements, wherein the first and the second light fans are pivoted in parallel to the longitudinal axis of the shaft end such that the light lines generated by the light fans on a base plate and across the fastening elements spaced from the appliance, respectively, are pivoted in parallel to the longitudinal axis.

13. The method according to claim 12, in which the first light fan and the second light fan are pivoted or slid symmetrically to one another by moving optical elements against a common longitudinal median plane.

14. The method according to claim 12, in which a fastening element is arranged in the first light line which the first light fan projects onto a plane spaced from the longitudinal axis and a fastening element is arranged along the second light line which the second light fan projects onto a plane spaced from the longitudinal axis.

15. The method according to claim 12, in which the appliance is stationarily fixed after or prior to the generation of the first and second light fans.

16. The method according to claim 12, wherein the light fans are pivoted in a coupled way.

\* \* \* \* \*